United States Patent
Yoo

(10) Patent No.: US 11,938,914 B2
(45) Date of Patent: *Mar. 26, 2024

(54) APPARATUS FOR VEHICLE BRAKING

(71) Applicant: HYUNDAI MOBIS CO., LTD., Seoul (KR)

(72) Inventor: Ji Ho Yoo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 336 days.

This patent is subject to a terminal disclaimer.

(21) Appl. No.: 17/350,601

(22) Filed: Jun. 17, 2021

(65) Prior Publication Data

US 2021/0394728 A1  Dec. 23, 2021

(30) Foreign Application Priority Data

Jun. 22, 2020 (KR) .......................... 10-2020-0075666

(51) Int. Cl.
*B60T 8/1755* (2006.01)
*B60T 8/1766* (2006.01)
(Continued)

(52) U.S. Cl.
CPC ........ *B60T 8/17554* (2013.01); *B60T 8/1766* (2013.01); *B60T 8/4081* (2013.01);
(Continued)

(58) Field of Classification Search
CPC ........ B60T 1/10; B60T 13/662; B60T 13/745; B60T 8/329; B60T 8/1766; B60T 8/4081;
(Continued)

(56) References Cited

U.S. PATENT DOCUMENTS

2004/0201270 A1* 10/2004 Suzuki ................. B60T 13/741
303/20
2007/0222284 A1* 9/2007 Matsubara ............. B60T 8/885
303/122.04
(Continued)

FOREIGN PATENT DOCUMENTS

DE 102013216477 A1 * 2/2015 ............ B60T 13/588

*Primary Examiner* — Robert A. Siconolfi
*Assistant Examiner* — San M Aung
(74) *Attorney, Agent, or Firm* — Morgan, Lewis & Bockius LLP

(57) ABSTRACT

The present disclosure in some embodiments provides a vehicle braking apparatus including wheel brakes for providing a braking force to one or more front and rear wheels, a first actuator including a first hydraulic circuit supplying braking force to at least some of wheel brakes, a first master cylinder adjusting hydraulic pressure of the first hydraulic circuit, and a first motor, a second actuator including a second hydraulic circuit supplying a braking force to at least a remainder of the wheel brakes, a second master cylinder adjusting hydraulic pressure of the second hydraulic circuit, and a second motor, an EPB generating a braking force on rear wheels, a regenerative braking system generating a regenerative braking force, and an ECU for controlling at least one of the first actuator, second actuator, electronic parking brake, or regenerative braking system upon determining whether the first actuator and the second actuator malfunction.

17 Claims, 8 Drawing Sheets

(51) Int. Cl.
_B60T 8/40_ (2006.01)
_B60T 17/22_ (2006.01)

(52) U.S. Cl.
CPC ........... _B60T 17/22_ (2013.01); _B60T 2230/03_ (2013.01); _B60T 2250/03_ (2013.01)

(58) Field of Classification Search
CPC .. B60T 8/17554; B60T 17/22; B60T 2250/03; B60T 2230/03; B60T 2270/60; B60T 2270/402; B60T 2270/608; B60T 8/94; B60T 8/171; B60T 8/1755; B60T 13/74; B60T 13/586; B60T 17/221; B60T 2700/406; B60T 2700/413; B60T 2700/604; B60Y 2306/15; B60Y 2400/81; B60Y 2400/3032; F16D 61/00; B60L 7/26
USPC ...................................................... 303/113.1
See application file for complete search history.

(56) References Cited

U.S. PATENT DOCUMENTS

| | | | | |
|---|---|---|---|---|
| 2011/0320099 | A1* | 12/2011 | Kim | B60T 13/746 |
| | | | | 701/70 |
| 2016/0082937 | A1* | 3/2016 | Nakaoka | B60T 8/321 |
| | | | | 303/15 |
| 2018/0215368 | A1* | 8/2018 | Isono | B60T 13/741 |
| 2018/0236876 | A1* | 8/2018 | Isono | B60T 13/746 |

\* cited by examiner

APPARATUS FOR VEHICLE BRAKING

CROSS-REFERENCE TO RELATED APPLICATIONS

This application is based on, and claims priority from, Korean Patent Application Number 10-2020-0075666, filed Jun. 22, 2020, the disclosure of which is incorporated by reference herein in its entirety.

TECHNICAL FIELD

The present disclosure in some embodiments relates to an apparatus for vehicle braking.

BACKGROUND

The statements in this section merely provide background information related to the present disclosure and do not necessarily constitute prior art.

A redundancy brake system is a backup system for subsidiarily controlling the braking of a vehicle in place of its main brake system when malfunctioning. A conventional braking system is provided with a redundancy brake system for auxiliary braking force in case of malfunction of the main braking system. When the main braking system operates normally, the conventional redundancy brake system enters a standby state without performing any function. In other words, the backup system is prone to be needless excess as long as the main system works well without trouble.

An active roll stabilizer (ARS) system is a control system for controlling a roll moment to prevent the vehicle body from rolling or tilting caused by centrifugal force when cornering right or left while the vehicle is driving or driving on a rough road. The ARS system measures the torque of a stabilizer bar connected to the wheels to control the roll moment, thereby improving the driver's ride comfort and driving safety of the vehicle. The ARS system is composed of an actuator, a valve unit, and a hydraulic pump. A conventional typical hydraulic active roll stabilizer has a disadvantage in terms of regaining space in a vehicle, since it needs to be provided with a separate drive source, for example, a hydraulic pump beside the braking system.

SUMMARY

According to at least one embodiment, the present disclosure provides an apparatus for braking a vehicle, including a plurality of wheel brakes, a first actuator, a second actuator, an electronic parking brake (EPB), a regenerative braking system, and a first electronic control unit (ECU). The plurality of wheel brakes is configured to provide a braking force to one or more front wheels and one or more rear wheels. The first actuator includes a first hydraulic circuit configured to supply a braking force to at least some of the plurality of wheel brakes, a first master cylinder configured to adjust a hydraulic pressure of the first hydraulic circuit, and a first motor. The second actuator includes a second hydraulic circuit configured to supply a braking force to at least a remainder of the plurality of wheel brakes, a second master cylinder configured to adjust a hydraulic pressure of the second hydraulic circuit, and a second motor. The EPB is configured to generate a braking force on the one or more rear wheels. The regenerative braking system is configured to generate a regenerative braking force. The first ECU is configured to, upon determining whether the first actuator and the second actuator malfunction, control at least one of the first actuator, the second actuator, the electronic parking brake, or the regenerative braking system. Here, the first ECU is configured, upon determining that the second actuator malfunctions, to control the electronic parking brake to provide a braking force to the one or more rear wheels and to control the first actuator to brake at least some of the plurality of wheel brakes. The first ECU is configured, upon determining that the first actuator malfunctions, to control the regenerative braking system to generate the regenerative braking force on the one or more front wheels and to control the second actuator to brake at least the remainder of the plurality of wheel brakes.

REFERENCE NUMERALS

Figure 1:
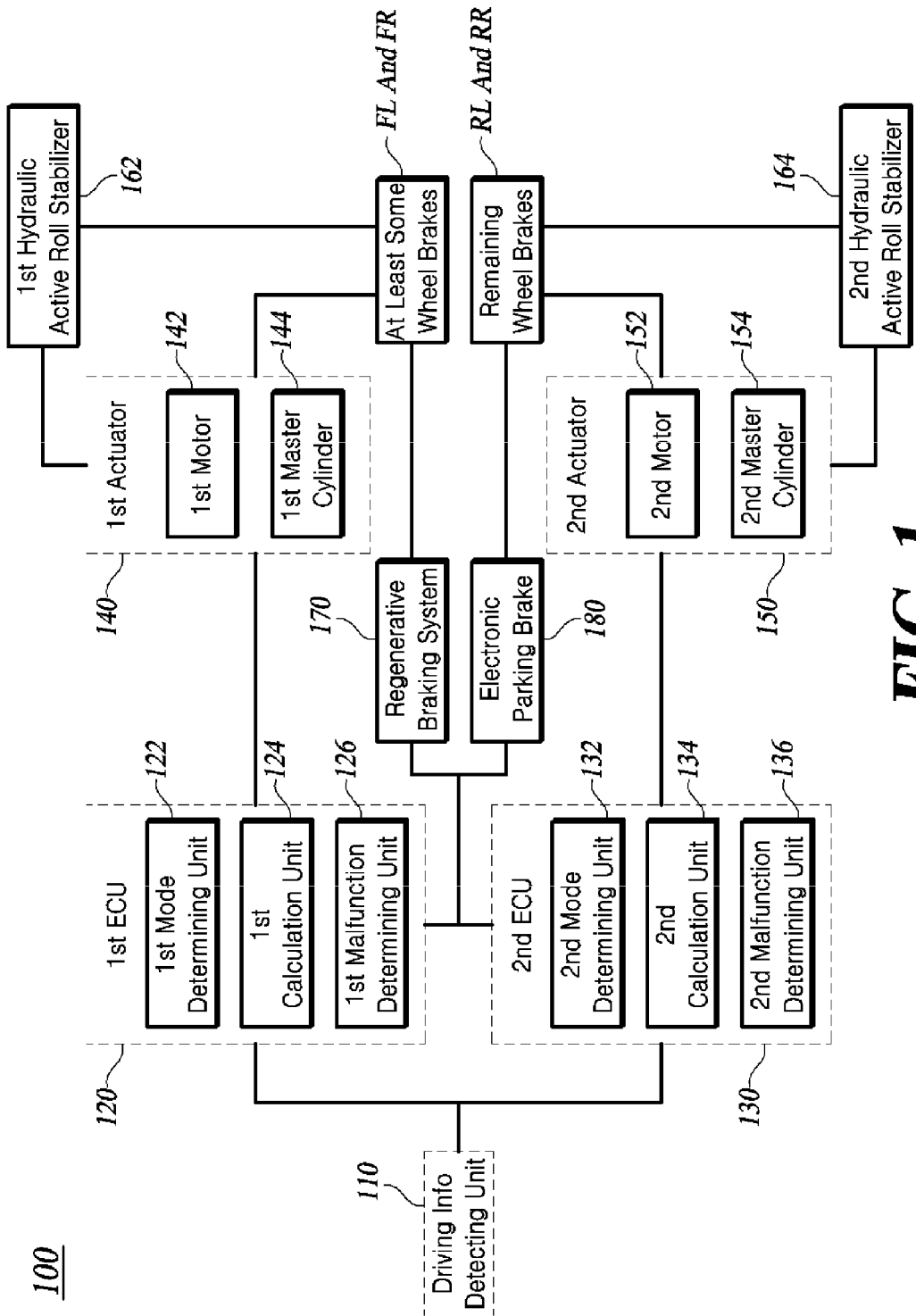
FIG. 1 is a block diagram of a braking apparatus according to at least one embodiment of the present disclosure.

110: driving information detector
120: first ECU
130: second ECU
140: first actuator
150: second drive unit
162, 164: hydraulic active roll stabilizer
170: regenerative braking system
180: electronic parking brake
710: redundancy master cylinder
FL, FR, RL, RR: multiple wheel brakes

DETAILED DESCRIPTION

Accordingly, the present embodiment seeks to have two actuators arranged for generating a braking force on the front and rear wheels, respectively, thereby allowing each actuator to actuate a reduced number of wheel brakes and reducing the amount of braking fluid required by a single actuator for the braking operation. With less required amount of braking fluid to permit the use of a low-specification motor, the present embodiment seeks to lower the production costs.

Further, the present disclosure in some embodiments seeks to have a hydraulic active roll stabilizer driven by using the hydraulic pressure of the actuator that generates the braking force, obviating the need for a separate driving source, thereby allowing an extra space to be secured in a vehicle.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

As shown in FIG. 1, a vehicle braking apparatus according to at least one embodiment of the present disclosure includes all or some of a plurality of wheel brakes FL, FR, RL, RR, a driving information detecting unit 110, a first electronic control unit (ECU) 120, a second ECU 130, a first actuator 140, a second actuator 150, first hydraulic active roll stabilizer (ARS) 162, a second hydraulic ARS 164, a regenerative braking system 170, and an electronic parking brake (EPB) 180.

A plurality of wheel brakes FL, FR, RL, RR includes a first wheel brake FL for braking the front left wheel of the vehicle and a second wheel brake FR for braking the front right wheel, a third wheel brake RL for braking the rear left wheel, and a fourth wheel brake RR for braking the rear right wheel.

The wheel brakes FL, FR, RL, RR are installed corresponding to the respective vehicle wheels. Each of the plurality of wheel brakes FL, FR, RL, RR is independently controlled and generates a braking force to each wheel.

The driving information detector 110 includes all or some of a wheel speed sensor, an acceleration sensor, a lateral acceleration sensor, and a pedal stroke sensor.

The wheel speed sensor detects the wheel speed of a wheel, the acceleration sensor detects the acceleration of the vehicle, the lateral acceleration sensor detects the lateral acceleration of the vehicle, and the pedal stroke sensor detects the stroke of the brake pedal. The driving information detector 110 transmits the information detected by the respective sensors as driving information to the first ECU 120 and the second ECU 130.

The first ECU 120 includes all or some of a first mode determining unit 122, a first (braking force) calculation unit 124, and a first malfunction determining unit 126.

The first ECU 120 controls the first actuator 140 to form a hydraulic pressure.

The first mode determining unit 122 determines a mode by using the driving information. Here, the driving information means information detected by the above-described sensors, for example, the brake pedal stroke, wheel speed, lateral acceleration, acceleration, and the like. Meanwhile, the mode is meant to include a cornering mode, a braking mode, and a cornering and braking mode. The cornering mode is a mode that engages when the vehicle is cornering right or left while driving or traveling on a rough road surface for controlling a roll moment to prevent the vehicle from tilting caused by centrifugal force. The braking mode is a mode of using a braking apparatus to form a braking force while the vehicle is running. The cornering and braking mode is a mode of performing both the controlling of the roll moment and the forming of roll moment while the vehicle is running.

The first mode determining unit 122 determines the mode by using the driving information. In more detail, upon detecting a stroke of the brake pedal, the first mode determining unit 122 determines that the control mode is the braking mode. Meanwhile, upon detecting a lateral acceleration of the vehicle, the first mode determining unit 122 determines the control mode as the cornering mode. Additionally, upon detecting both the pedal stroke and the lateral acceleration, the first mode determining unit 122 determines the control mode as the cornering and braking mode.

The first calculation unit 124 calculates the braking force required for braking when the first mode determining unit 122 determines that the control mode is the braking mode, calculates the torque for controlling the roll moment when the first mode determining unit 122 determines that the control mode is the cornering mode, and calculates the braking force and torque when the first mode determining unit 122 determines that the control mode is the cornering and braking mode.

The first malfunction determining unit 126 determines whether or not the first actuator 140 and/or the second actuator 150 malfunction. According to the determination result of the first malfunction determining unit 126, braking is achieved differently by using the regenerative braking system 170 or the electronic parking brake 180.

FIG. 1 illustrates a configuration wherein the first ECU 120 controls the regenerative braking system 170 and the second ECU 130 controls the second actuator 150. However, the present disclosure, not limited to this configuration, encompasses controlling either one of the first ECU 120 and the second actuator 150 and controlling both of them.

For example, when the first malfunction determining unit 126 determines the first actuator 140 as normally operating and the second actuator 150 malfunctions, the first ECU 120 controls to supply hydraulic pressure to at least some of the wheel brakes to form the braking force, and the electronic parking brake 180 controls to form the braking force on the remainder of the wheel brakes. Here, at least some of the wheel brakes may be, for example, two wheel brakes, and more specifically, may be FL and FR.

On the other hand, when the first malfunction determining unit 126 determines that both the first actuator 140 and the second actuator 150 are normal, the first ECU 120 controls the first actuator 140 to supply hydraulic pressure to some of the wheel brakes to form the braking force. Here, some of the wheel brakes may be, for example, two of the wheel brakes, and more specifically, may be FL and FR.

The second ECU 130 includes all or some of a second mode determining unit 132, a second (braking force) calculation unit 134, and a second malfunction determining unit 136.

The second ECU 130 controls the second actuator 150 to form hydraulic pressure.

A duplicate of the first ECU 120, the second ECU 130 is not different but its renamed elements, so further description thereof will be omitted.

When the second malfunction determining unit 136 determines that the second actuator 150 as normally operating and the first actuator 140 malfunctions, the second ECU 130 controls the second actuator 150 to supply hydraulic pressure to at least some of the wheel brakes to form the braking force, and the regenerative braking system 170 controls to form the braking force on the remainder of the wheel brakes.

Here, at least some of the wheel brakes may be, for example, two wheel brakes, and more specifically, may be RL and RR.

On the other hand, when the second malfunction determining unit 136 determines that both the first actuator 140 and the second actuator 150 are normal, the second ECU 130 controls the second actuator 150 to supply hydraulic pressure to some of the wheel brakes to form the braking force. Here, some of the wheel brakes may be, for example, two of the wheel brakes, and more specifically, may be FR and FL.

A case where both the first actuator 140 and the second actuator 150 malfunction will be described below.

In the end, when both the first actuator 140 and the second actuator 150 are normal, the first ECU 120 and the second ECU 130 control the first actuator 140 and the second actuator 150 to supply hydraulic pressure to the two of the wheel brakes, respectively.

On the other hand, upon determining that the first actuator 140 malfunctions, the second ECU 130 controls the second actuator 150 to perform the hydraulic control, and the regenerative braking system 170 controls to form the regenerative braking force. Upon determining that the second actuator 150 malfunctions, the first ECU 120 controls the first actuator 140 to perform the hydraulic control, and the electronic parking brake 180 controls to form the braking force.

When compared, the present embodiment has a major difference from an ordinary control system for securing redundancy, as follows. In the ordinary control system, when the main braking system is normal, the redundancy brake system contributes to nothing. Accordingly, when both the main braking system and the redundancy brake system are normal, the main braking system does supply hydraulic pressure to all of the wheel brakes.

Whereas, in at least one embodiment of the present disclosure, when all the actuators, for example, the first actuator 140 and the second actuator 150 are normal, the first ECU 120 and the second ECU 130 each control to supply the hydraulic pressure to the two of the wheel brakes, thereby halving the number of wheel brakes that any one system is supposed to be responsible for. This brings an improved brake response speed.

The first actuator 140 includes a first motor 142, a first master cylinder 144, and a first hydraulic circuit (not shown).

The first master cylinder 144 is driven by the first motor 142 controlled by the first ECU 120 to generate hydraulic pressure. The generated hydraulic pressure is supplied to some of the wheel brakes, for example, two wheel brakes, and more specifically, FL and FR.

Compared to a typical braking apparatus with a single actuator braking all four of the wheel brakes, the present disclosure in at least one embodiment allows the first actuator 140 to serve a reduced number of wheel brakes to actuate. This reduces the required amount of brake fluid for the first actuator 140 to actuate the wheel brakes. With the required amount of brake fluid reduced, the first actuator 140 may use a motor having a relatively low specification, resulting in reduced production costs.

Figure 6:
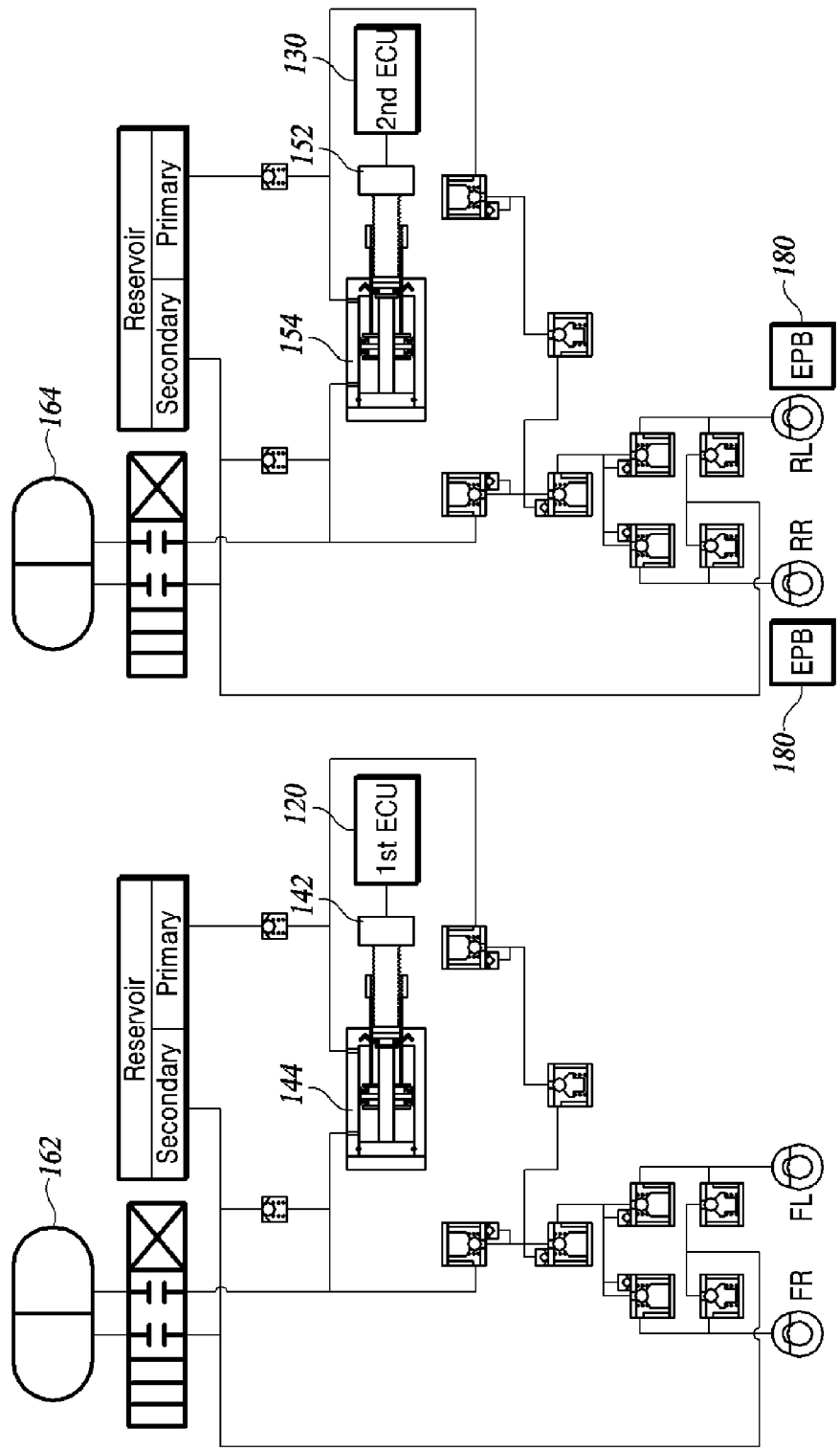
FIG. 6 is a diagram of a double-acting braking apparatus according to at least one embodiment of the present disclosure.

The first actuator 140 constitutes a separate hydraulic circuit from the second actuator 150. FIG. 6 illustrates that the first actuator 140 includes no solenoid valve that connects to the second actuator 150, with the first actuator 140 and the second actuator 150 each constituting an independent hydraulic circuit, and the first actuator 140 supplies the braking force to some of the wheel brakes exclusively.

A more detailed process of supplying the hydraulic pressure is as follows. In an example occasion, when the driver depresses the brake pedal, the stroke sensor detects and transmits the stroke of the brake pedal to the first ECU 120 which controls, based on the received stroke, the first motor 142 for causing the first master cylinder 144 to generate the hydraulic pressure.

The second actuator 150 includes a second motor 152 and a second master cylinder 154, and a second hydraulic circuit (not shown).

The second master cylinder 154 is driven by the second motor 152 controlled by the second ECU 130 to generate hydraulic pressure. The generated hydraulic pressure is supplied to the remainder of the wheel brakes, for example, two wheel brakes, and more specifically, RL and RR.

As with the first actuator 140, the second actuator 150 reduces the required amount of brake fluid, thereby effecting reduced production costs.

As with the first actuator 140, the second actuator 150 constitutes a separate hydraulic circuit. As shown in FIG. 6, the second actuator 150 includes no solenoid valve that connects to the first actuator 140, with the first actuator 140 and the second actuator 150 each constituting an independent hydraulic circuit, and the second actuator 150 supplies the braking force to some of the wheel brakes exclusively.

A more detailed process of supplying hydraulic pressure is as follows. When the driver depresses the brake pedal, the stroke sensor detects and transmits the stroke of the brake pedal to the second ECU 130. The second ECU 130 controls, based on the received stroke, the second motor 152 for causing the second master cylinder 154 to generate hydraulic pressure.

The regenerative braking system 170 may include all or some of a battery (not shown) that stores energy due to the back electromotive force generated from an electric motor (not shown) during regenerative braking, the electric motor performing the regenerative braking by using the inertia force of the vehicle to maintain the straight motion during the braking of the vehicle, and a hybrid control unit (HCU, not shown) for calculating a regenerative braking force that can be provided to the vehicle due to the regenerative braking and thereby controlling to carry out the regenerative braking. Regenerative braking is to reduce the driving speed of the vehicle by weakening the propulsive force of the vehicle by generating reverse torque from the motor.

The regenerative braking system 170 may supply electric power to the electric motor when the vehicle is running. The regenerative braking system 170 drives the electric motor in response to the regenerative braking signals generated by the first ECU 120 and the second ECU 130 to generate a regenerative braking force. Accordingly, during braking, the regenerative braking system 170 and the hydraulic braking unit cooperate to achieve the braking so that a strong and stable braking force can be supplied to the vehicle.

The regenerative braking system 170 forms a braking force on some of the wheels. Here, some wheels are, for example, the front left wheel and the rear left wheel.

The electronic parking brake 180 is adapted to provide various additional functions for improving convenience and stability of vehicle operation besides the basic function of making the vehicle immobile during parking. One of these additional functions is the dynamic braking function that brakes the vehicle while driving. Dynamic braking is a function in which the ECU 120 or 130 can utilize the electronic parking brake 180 as an emergency braking apparatus when an abnormality occurs in the hydraulic brake mounted on the vehicle.

The electronic parking brake 180 forms a braking force on the wheels according to a signal from the first ECU 120 or the second ECU 130. According to at least one embodiment of the present disclosure, the electronic parking brake 180 is provided only on the rear wheels. The electronic parking brake 180 is reasonably provided only on each of the rear wheels to save the cost of their installation on the front wheels while reducing the footprint of output terminals to facilitate securing more space in the vehicle. However, it should be noted that the present disclosure is not limited to the illustrated configuration, but it includes the reverse thereof, where the electronic parking brake 180 is provided only on each of the front wheels.

Upon determining that both the first actuator 140 and the second actuator 150 malfunction, the first ECU 120 or the second ECU 130 controls the regenerative braking system 170 and the electronic parking brake 180 to brake the vehicle. For example, the first ECU 120 controls the regenerative braking system 170 to perform regenerative braking on the front wheels and controls the electronic parking brake 180 to brake the rear wheels. In the same way as the first ECU 120, the second ECU 130 may also control the regenerative braking system 170 and the electronic parking brake 180 to brake the vehicle. The second ECU 130 may perform all functions that the first ECU 120 can perform.

The two ECUs 120 and 130 are reasonably provided in the present disclosure to provide fail-proof braking of the vehicle to safely against a possible malfunction occurring in any one of the two ECUs 120 and 130.

More specifically, upon determining that both the first actuator 140 and the second actuator 150 malfunction, the first ECU 120 controls the regenerative braking system 170 and the electronic parking brake 180 to brake the vehicle. However, when the first ECU 120 also malfunctions here, the second ECU 130 controls the regenerative braking system 170 and the electronic parking brake 180 to brake the vehicle.

The first hydraulic active roll stabilizer 162 includes an actuator (not shown) and a plurality of control valves (not shown).

Since the hydraulic active roll stabilizer is well known in the art, a detailed description will be omitted. However, the detailed description of the present disclosure focuses on its difference from the typical stabilizer.

A typical active roll hydraulic stabilizer is provided with a separate hydraulic pump to maintain the balance of the vehicle by using the driving force of the hydraulic pump. However, the hydraulic active roll stabilizer (ARS) of the present disclosure maintains the balance of the vehicle by using the hydraulic pressure of the first master cylinder 144 included in the first actuator 140 without a separate hydraulic pump. This obviates the need to provide a separate hydraulic pump, thereby reducing cost and advantageously securing that much space in the vehicle.

The first hydraulic active roll stabilizer 162 is controlled according to the command of the first ECU 120.

The second hydraulic active roll stabilizer 164 only has a difference controlled according to the command of the second ECU 130, and otherwise the same as the first hydraulic active roll stabilizer 162, so a detailed description thereof will be omitted.

Figure 2:
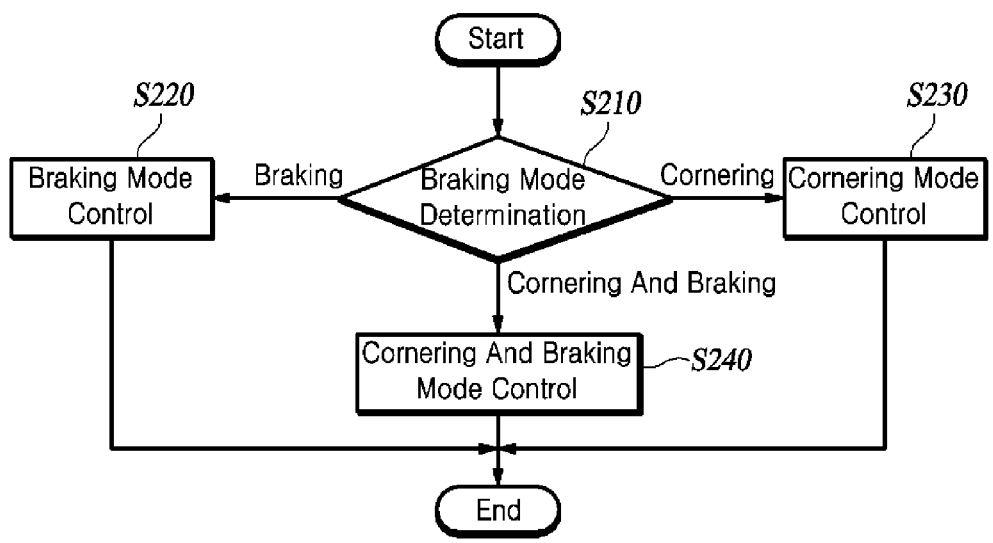
FIG. 2 is a schematic flowchart of an illustrative braking process by a first ECU or a second ECU according to at least one embodiment of the present disclosure.

FIG. 2 is a schematic flowchart of an illustrative braking process by the first ECU 120 or the second ECU 130 according to at least one embodiment of the present disclosure.

As shown in FIG. 2, the first ECU 120 of the present disclosure determines the control mode by using the driving information detected by the driving information detector 110 (S210).

Here, the process of determining the control mode by using the driving information by the first ECU 120 refers to the contents described in FIG. 1.

Upon determining the control mode as the braking mode, the first ECU 120 controls the first actuator 140 and the second actuator 150 according to Step S220. Step S220 will be described in detail in FIG. 3.

Upon determining the control mode as the cornering mode, the first ECU 120 controls the first actuator 140 and the second actuator 150 according to Step S230. Step S230 will be described in detail in FIG. 4.

Upon determining the control mode as the cornering and braking mode, the first ECU 120 controls the first actuator 140 and the second actuator 150 according to Step S240. Step S240 will be described in detail in FIG. 5.

The first ECU 120 terminates the algorithm when the control process is ended according to Steps S220, S230, and S240.

Figure 3:
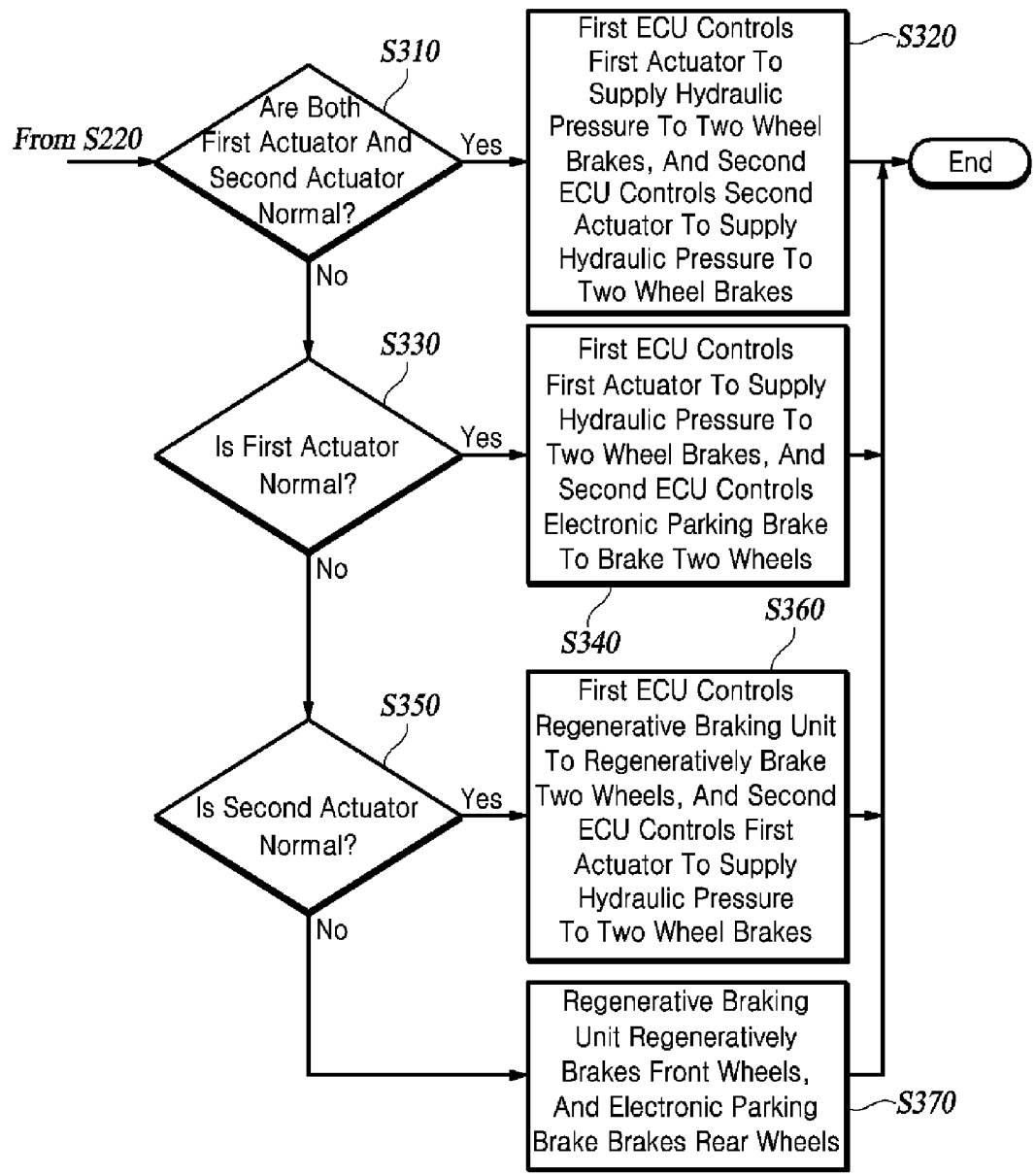
FIG. 3 is a detailed flowchart of Step S220 of FIG. 2.

FIG. 3 is a detailed flowchart of Step S220 of FIG. 2.

As shown in FIG. 3, the ECU determines whether the first actuator 140 and the second actuator 150 are normal (S310). Here, the ECU is, for example, the first ECU 120 or the second ECU 130.

Upon determining that both the first actuator 140 and the second actuator 150 are normal in Step S310, the first ECU 120 controls the first actuator 140 to supply hydraulic pressure to at least some of the wheel brakes, and the second ECU 130 controls the second actuator 150 to supply hydraulic pressure to the remainder of the wheel brakes to form a braking force (S320). Here, at least some of the wheel brakes may be, for example, FL and RR, and the remainder may be FR and RL.

On the other hand, upon determining that there is an abnormal actuator between the first actuator 140 and the second actuator 150 in Step S310, the first ECU 120 determines whether the first actuator 140 is normal (S330).

Determining that the first actuator 140 is normal in Step S330 indicates that a malfunction has occurred in the second actuator 150. In this case, the first ECU 120 controls the first actuator 140 to supply hydraulic pressure to at least some of the wheel brakes exclusively to form the braking force, and the second ECU 130 controls the electronic parking brake 180 to supply hydraulic pressure to the remainder of the wheel brakes at the relevant wheels to form the braking force (S340). Here, at least some of the wheel brakes may be, for example, two wheel brakes, and more specifically, FL and FR. The relevant wheels to the remainder of the wheel brakes may be the rear left wheel and the rear right wheel.

On the other hand, upon determining that the first actuator 140 is abnormal in Step S330, or when the first actuator 140 is faulty, the second ECU 120 determines whether the second actuator 150 is normal (S350).

Determining that the second actuator 150 is normal in Step S350 indicates that a malfunction has occurred in the first actuator 140. In this case, the second ECU 130 controls the first actuator 140 to supply hydraulic pressure to at least some of the wheel brakes exclusively to form the braking force. At the same time, the first ECU 120 controls the electronic parking brake 180 to supply hydraulic pressure to the remainder of the wheel brakes at the relevant wheels to form the braking force (S360). Here, at least some of the wheel brakes may be, for example, two wheel brakes, and more specifically, RL and RR. The relevant wheels to the remainder of the wheel brakes may be the front left wheel and the front right wheel.

On the other hand, upon determining that the second actuator 150 is abnormal in Step S350, or upon determining that both the first actuator 140 and the second actuator 150 are defective, the ECU cannot control the hydraulic pressure. Accordingly, in this case, the ECU controls the regenerative braking system 170 to perform regenerative braking and controls the electronic parking brake 180 to form a braking force. For example, the front wheels may be braked by regenerative braking, and the rear wheels may be braked by the electronic parking brake 180 (S370).

The flowchart of FIG. 3 is one of the embodiments of the present disclosure, and the ECU of the present disclosure may include another flowchart for determining whether the first actuator 140 and the second actuator 150 malfunction, for example, determining the second actuator 150 first whether it malfunctions.

Figure 4:
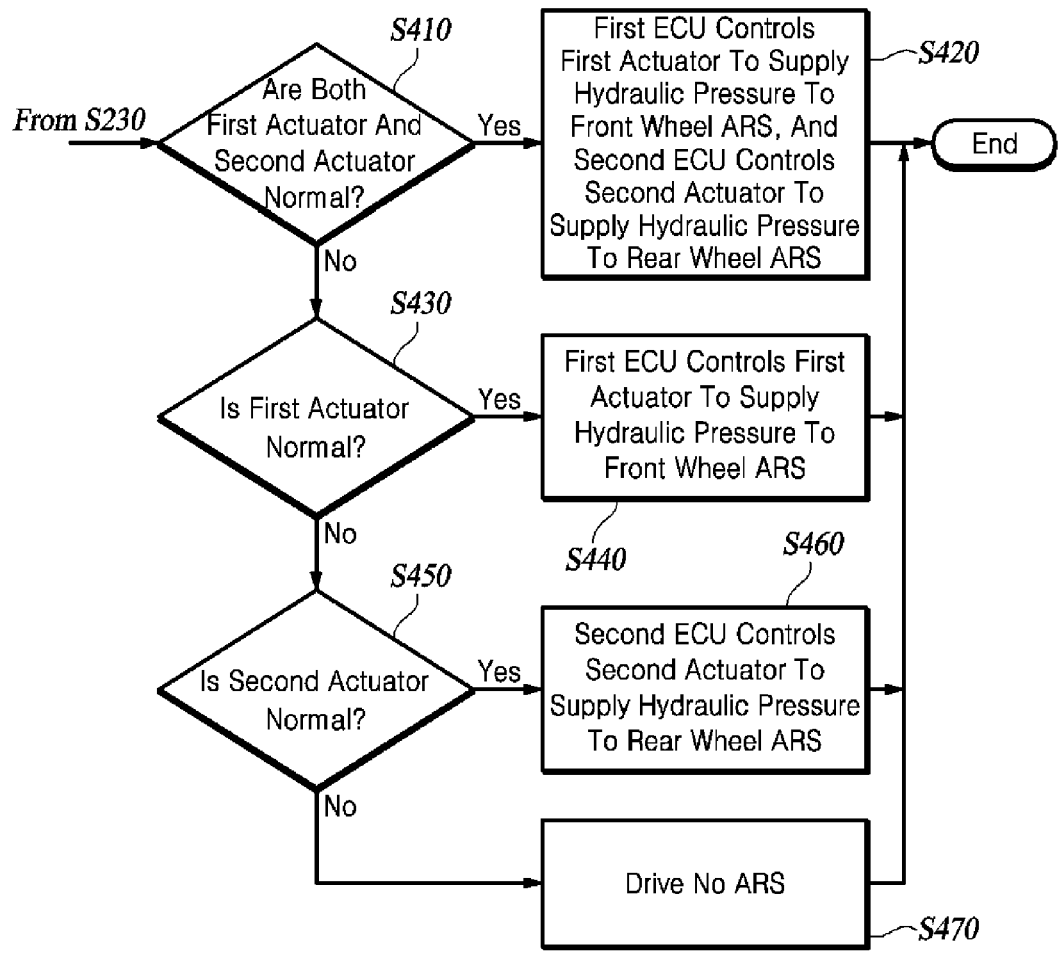
FIG. 4 is a detailed flowchart of Step S240 of FIG. 2.

FIG. 4 is detailed flowchart of Step S240 of FIG. 2.

As shown in FIG. 4, the ECU determines whether the first actuator 140 and the second actuator 150 are normal (S410). Here, the ECU is, for example, the first ECU 120 or the second ECU 130.

Upon determining that both the first actuator 140 and the second actuator 150 are normal in Step S410, the first ECU 120 controls the first actuator 140 to supply hydraulic pressure to the first hydraulic active roll stabilizer 162 for maintaining the balance of the vehicle, and the second ECU 130 controls the second actuator 150 to supply hydraulic pressure to the second hydraulic active roll stabilizer 164 for maintaining the balance of the vehicle (S420). For example, the first hydraulic active roll stabilizer 162 stabilizes the front wheels, and the second hydraulic active roll stabilizer 164 stabilizes the rear wheels.

On the other hand, upon determining that there is an abnormal actuator between the first actuator 140 and the second actuator 150 in Step S410, the ECU determines whether the first actuator 140 is normal (S430).

Determining that the first actuator 140 is normal in Step S430 indicates that a malfunction has occurred in the second actuator 150. In this case, the first ECU 120 controls the normal first actuator 140 to supply hydraulic pressure to the first hydraulic active roll stabilizer 162 for maintaining the balance of the vehicle (S440). Here, operation of the first hydraulic active roll stabilizer 162 maintaining the balance of the vehicle means stabilizing either the front wheels or the rear wheels.

Upon determining that the first actuator 140 is abnormal in Step S430, or when the first actuator 140 is malfunctioning, the ECU performs a step of determining whether the second actuator 150 is normal (S450).

Determining that the second actuator 150 is normal in Step S450 indicates that a malfunction has occurred in the first actuator 140. In this case, the second ECU 130 controls the normal second actuator 150 to supply hydraulic pressure to the second hydraulic active roll stabilizer 164 for maintaining the balance of the vehicle (S460). Here, the operation of the second hydraulic active roll stabilizer 164 maintaining the balance of the vehicle means stabilizing either the front wheels or the rear wheels.

On the other hand, upon determining that the second actuator 150 is abnormal in Step S450, or when it is determined that both the first actuator 140 and the second actuator 150 malfunction, the ECU controls none of the hydraulic active roll stabilizer 162 and the second hydraulic active roll stabilizer 164 (S470).

Figure 5:
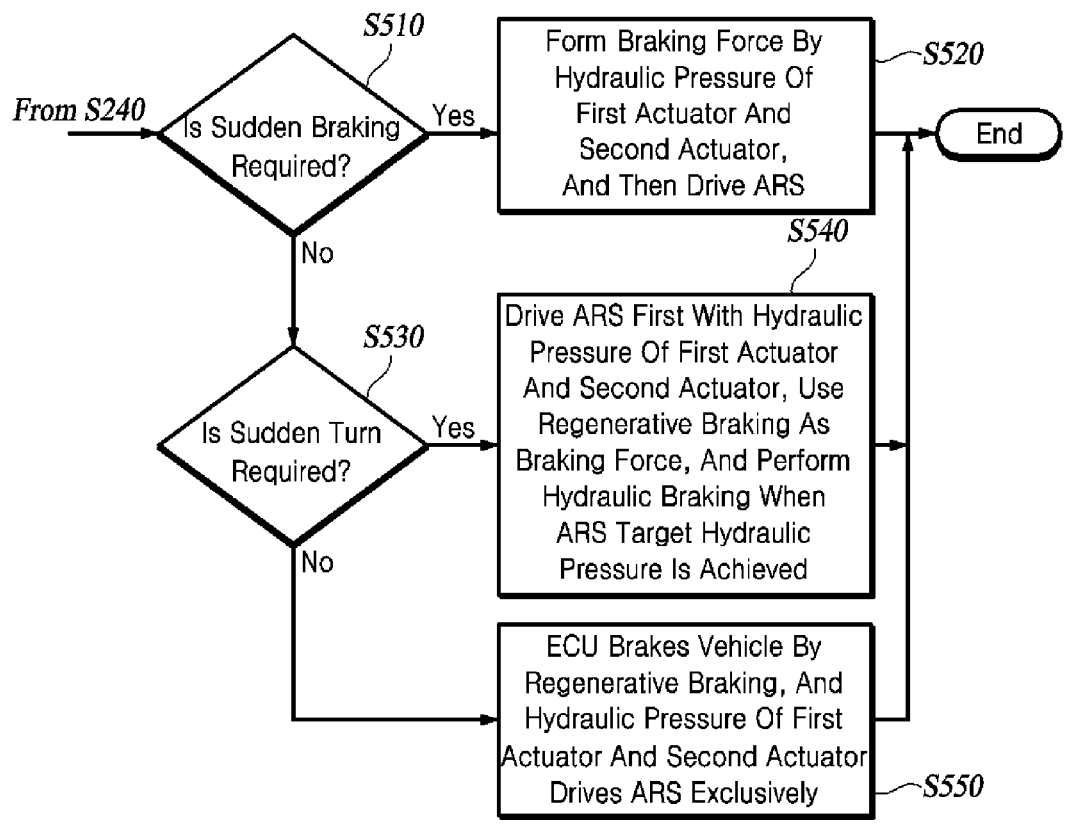
FIG. 5 is a detailed flowchart of Step S250 of FIG. 2.

FIG. 5 is a detailed flowchart of Step S240 of FIG. 2.

As shown in FIG. 5, the ECU determines whether sudden braking is required (S510). The ECU uses the driving information to determine whether sudden braking is required. Here, the ECU is, for example, the first ECU 120 or the second ECU 130. For example, the ECU determines that emergency braking is required when the pedal stroke increases abruptly or when the acceleration sensor surges.

Upon determining that the vehicle requires sudden braking, the ECU controls the first actuator 140 and the second actuator 150 to supply hydraulic pressure to the wheel brakes to form a braking force. With sufficient braking force formed, the ECU controls the first actuator 140 and the second actuator 150 to supply hydraulic pressure to the first hydraulic active roll stabilizer 162 and the second hydraulic active roll stabilizer 164 to maintain the balance of the vehicle (S520).

On the other hand, upon determining that the vehicle requires no sudden braking, the ECU determines whether the vehicle requires a sudden cornering or turn (S530). The ECU uses the driving information to determine whether a sudden turn is required. For example, the ECU determines that emergency cornering is required when the roll moment is abruptly increased.

Upon determining that a sudden turn is required for the vehicle, the ECU controls the first actuator 140 and the second actuator 150 to supply hydraulic pressure to the first hydraulic active roll stabilizer 162 and the second hydraulic active roll stabilizer 164 for maintaining the balance of the vehicle, while controlling the regenerative braking system 170 to form a regenerative braking force. Once the vehicle body is stabilized, the ECU controls the first actuator 140 and the second actuator 150 to supply hydraulic pressure to the wheel brakes FL, FR, RL, RR (S540).

Upon determining that the vehicle requires no sudden turn, the ECU controls the regenerative braking system 170 to form a regenerative braking force and controls the first actuator 140 and the second actuator 150 to supply hydraulic pressure to the first hydraulic active roll stabilizer 162 and the second hydraulic active roll stabilizer 164 for stabilizing the vehicle (S550).

FIG. 6 is a diagram of a double-acting braking apparatus according to at least one embodiment of the present disclosure.

As shown in FIG. 6, in at least one embodiment of the present disclosure, the first actuator brakes two of the four wheel brakes, and the second actuator brakes the remainder of the wheel brakes. Here, the two of the wheel brakes may be, for example, RR and RL, and the remainder of the wheel brakes may be, for example, FR and FL.

When configured to be independent, the first actuator and the second actuator can reduce their motor capacity. When configured to be integral, the first actuator and the second actuator each need to have a motor having a capacity sufficient to form braking force on all of the wheel brakes. On the other hand, when configured to be independent, the first actuator and the second actuator each need to brake only two wheel brakes, so they only need to have a motor having a capacity enough to form braking force to the two of wheel brakes. Accordingly, the present disclosure may appropriately use a motor having a low motor output, thereby effecting a reduced motor capacity. With the motor capacity reduced, the present disclosure can reduce manufacturing costs.

Additionally, the master cylinder according to at least one embodiment of the present disclosure is configured as a double acting type like a typical master cylinder. The double-acting master cylinder discharges hydraulic pressure when its piston moves forward and again discharges hydraulic pressure through a right side hydraulic circuit when the piston moves backward. In other words, as the piston moves forward or backward, the master cylinder generates hydraulic pressure.

Figure 7:
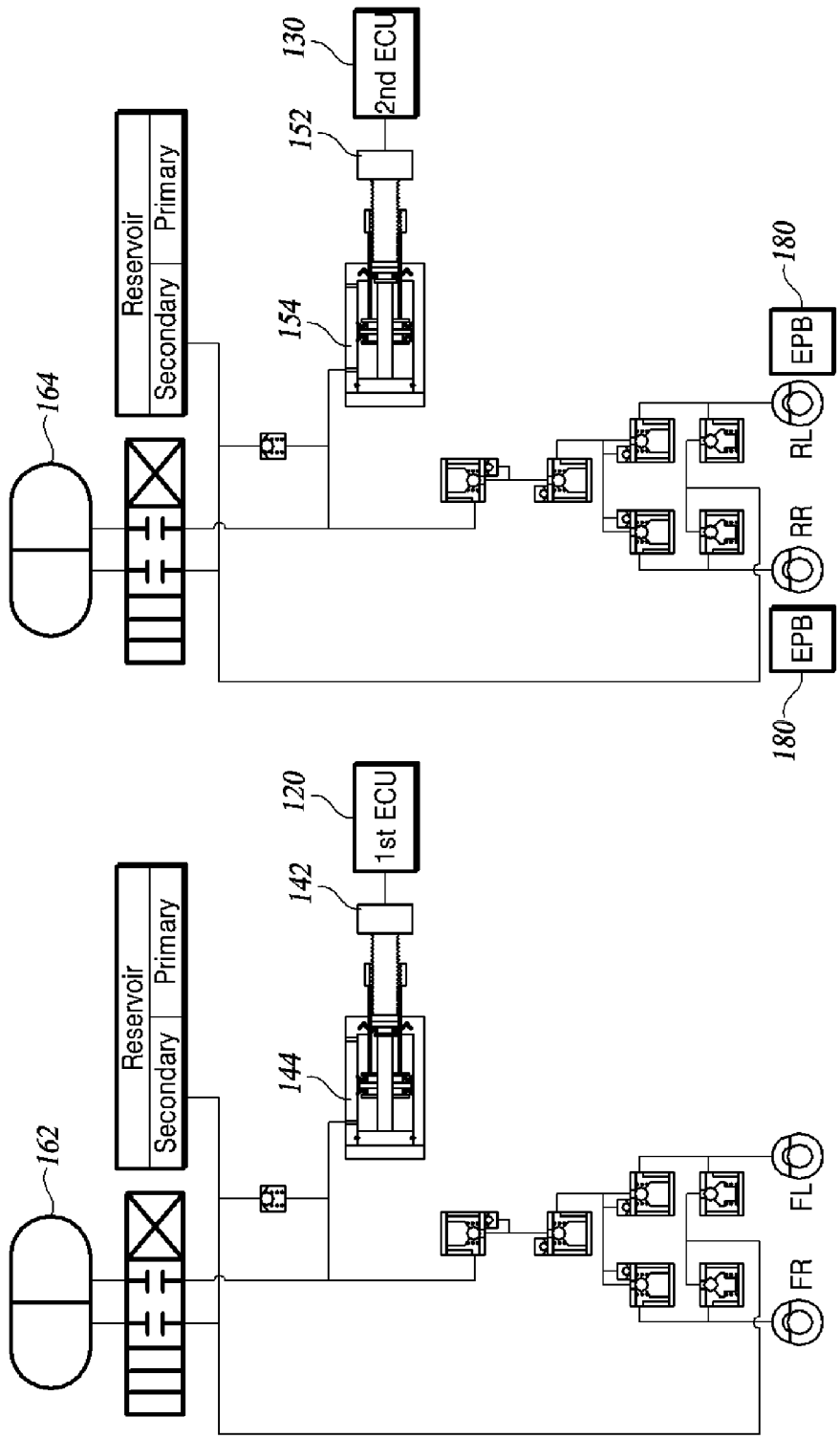
FIG. 7 is a diagram of a single-acting braking apparatus according to at least one embodiment of the present disclosure.

FIG. 7 is a diagram of a single-acting braking apparatus according to at least one embodiment of the present disclosure.

As shown in FIG. 7, the embodiment according to FIG. 6 features the first actuator as configured in a single acting type. The single-acting master cylinder generates hydraulic pressure only when the piston moves forward. The single-acting master cylinder cannot generate hydraulic pressure when the piston moves backward, but in at least one embodiment of the present disclosure renders one master cylinder to be responsible for braking just two of the wheel brakes, requiring less hydraulic pressure than having to brake all four wheel brakes. Therefore, even with a single-acting master cylinder used, the present disclosure can generate a sufficient braking force, and thus, successfully use a single-acting master cylinder having a small number of valves. In sum, compared with the embodiment of FIG. 6, the embodiment of the present disclosure according to FIG. 7 needs a reduced number of valves to form a braking force in the wheel brakes. As the number of valves decreases, the product cost is reduced.

Figure 8:
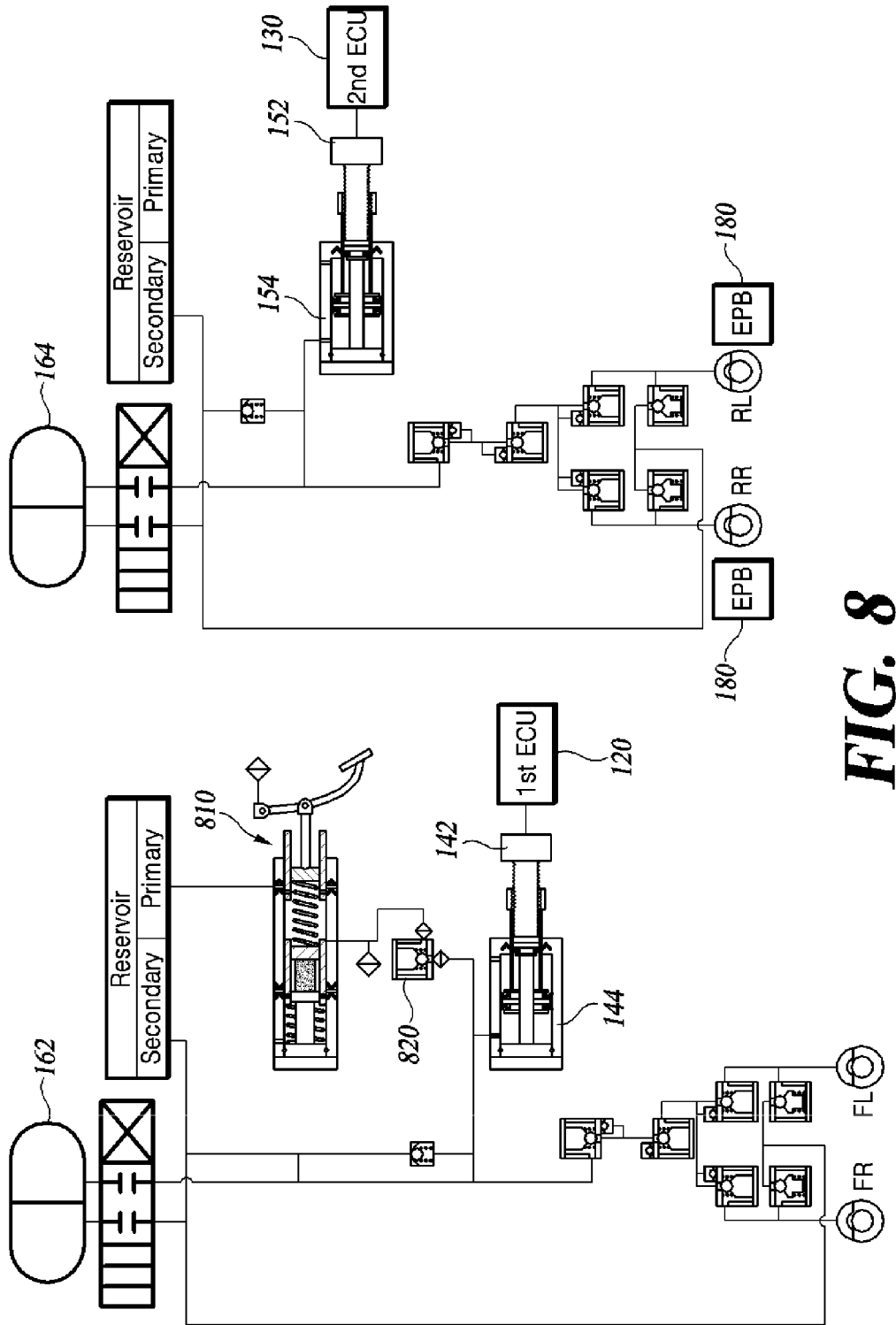
FIG. 8 is a diagram of an integrated-pedal braking apparatus according to at least one embodiment of the present disclosure.

FIG. 8 is a diagram of a pedal-integrated braking apparatus according to at least one embodiment of the present disclosure.

As shown in FIG. 8, further to the embodiment according to FIG. 7, at least one embodiment of the present disclosure includes a redundancy master cylinder 810 and a redundancy valve 820.

When the first actuator 140 or the second actuator 150 is normal, a pedal simulator is established for providing a sense of reaction or reactive feel for allowing the driver to feel the same pedal pressure as with an ordinary hydraulic braking system. In other words, when the first actuator 140 or the second actuator 150 is normal, the redundancy master cylinder 810 performs a pedal simulator function that provides a reactive feel to the driver.

On the other hand, when the first actuator 140 malfunctions, the redundancy valve 820 is opened. Accordingly, the redundancy master cylinder 810 forms a braking force by supplying hydraulic pressure to at least some of the wheel brakes, which are FL and FR. Additionally, the first ECU 120 controls the regenerative braking system 170 to brake the front wheels. In other words, when the first actuator 140 malfunctions, the redundancy master cylinder 810 performs a function of braking the vehicle in tandem with the regenerative braking system 170.

When the second actuator 150 malfunctions, the first ECU 120 controls the electronic parking brake 10 to brake the rear wheels.

As described above, according to some embodiments of the present disclosure, the main system in normal operation is still attended by the backup redundancy system to cooperatively form the braking force to halve the number of wheel brakes into two for relieving the main system from having to supply the hydraulic pressure to four wheel brakes, thereby improving the braking stability and braking response speed.

Further, according to some embodiments of the present disclosure, as the hydraulic active roll stabilizer does not have a separate dedicated driving source and instead uses the actuator that generates the braking force, the vehicle can secure an extra space as much as the footprint of a separate drive source that is no more.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for braking a vehicle, comprising:
   a plurality of wheel brakes configured to provide a braking force to one or more front wheels and one or more rear wheels;
   a first actuator comprising:
      a first hydraulic circuit configured to supply a braking force to at least some of the plurality of wheel brakes,
      a first master cylinder configured to adjust a hydraulic pressure of the first hydraulic circuit, and
      a first motor;
   a second actuator comprising:
      a second hydraulic circuit configured to supply a braking force to at least a remainder of the plurality of wheel brakes,
      a second master cylinder configured to adjust a hydraulic pressure of the second hydraulic circuit, and
      a second motor;
   an electronic parking brake (EPB) configured to generate a braking force on the one or more rear wheels;
   a regenerative braking system configured to generate a regenerative braking force; and
   a first electronic control unit (ECU) configured to, upon determining whether the first actuator and the second actuator malfunction, control at least one of the first actuator, the second actuator, the electronic parking brake, or the regenerative braking system,
   wherein the first ECU is configured, upon determining that the second actuator malfunctions, to control the electronic parking brake to provide a braking force to the one or more rear wheels and to control the first actuator to brake at least some of the plurality of wheel brakes, and
   the first ECU is configured, upon determining that the first actuator malfunctions, to control the regenerative braking system to generate the regenerative braking force on the one or more front wheels and to control the second actuator to brake at least the remainder of the plurality of wheel brakes.

2. The apparatus of claim 1, further comprising:
   a second electronic control unit (ECU) configured to, upon determining whether or not the first actuator and the second actuator malfunction, control at least one of the first actuator, the second actuator, the electronic parking brake, or the regenerative braking system,
   wherein the second ECU is configured to determine whether the first ECU malfunctions and to perform in place of the first ECU upon determining that the first ECU malfunctions.

3. The apparatus of claim 2, wherein the second ECU is configured, upon determining that the second actuator malfunctions, to control the electronic parking brake to provide the braking force to the one or more rear wheels and to control the first actuator to brake at least some of the plurality of wheel brakes, and
the second ECU is configured, upon determining that the first actuator malfunctions, to control the regenerative braking system to generate a regenerative braking force on the one or more front wheels and to control the second actuator to brake at least the remainder of the plurality of wheel brakes.

4. The apparatus of claim 1, further comprising:
a redundancy master cylinder configured to generate a braking force based on a pedal stroke of a brake pedal,
wherein the redundancy master cylinder is configured to brake the vehicle upon determining that both the first actuator and the second actuator malfunction.

5. The apparatus of claim 4, wherein the redundancy master cylinder comprises:
a pedal simulator configured to provide a reactive feel to a driver of the vehicle.

6. The apparatus of claim 1, further comprising:
a driving information detector configured to detect driving information of the vehicle,
wherein the first ECU is configured to utilize the driving information for determining a sudden braking or a sudden turn of the vehicle.

7. The apparatus of claim 6, wherein the driving information comprises:
one of a lateral acceleration, a wheel speed, a pedal stroke, and an acceleration.

8. The apparatus of claim 6, wherein the driving information detector comprises:
a wheel speed sensor configured to detect a wheel speed of the vehicle,
wherein the first ECU is configured to, based on the detected wheel speed, determine whether the sudden braking is required for the vehicle, and
the first ECU is configured to, when the sudden braking is required, cause the first actuator to preferentially supply a hydraulic pressure to the plurality of wheel brakes to form the braking force.

9. The apparatus of claim 8, wherein the at least some of the plurality of wheel brakes comprise:
wheel brakes configured to generate braking force on a front left wheel and a front right wheel, respectively.

10. The apparatus of claim 8, wherein the at least some of the plurality of wheel brakes comprise:
wheel brakes configured to generate braking force on a front left wheel and a rear left wheel, respectively.

11. The apparatus of claim 8, wherein the at least some of the plurality of wheel brakes comprise:
wheel brakes configured to generate braking force on a front left wheel and a rear right wheel, respectively.

12. The apparatus of claim 1, wherein the at least some of the plurality of wheel brakes comprise:
wheel brakes configured to generate braking force on a front left wheel and a front right wheel, respectively.

13. The apparatus of claim 1, wherein the at least some of the plurality of wheel brakes comprise:
wheel brakes configured to generate braking force on a front left wheel and a rear left wheel, respectively.

14. The apparatus of claim 1, wherein the at least some of the plurality of wheel brakes comprise:
wheel brakes configured to generate braking force on a front left wheel and a rear right wheel, respectively.

15. An apparatus for braking a vehicle, comprising:
a plurality of wheel brakes configured to provide a braking force to one or more front wheels and one or more rear wheels;
a first actuator comprising:
a first hydraulic circuit configured to supply a braking force to at least some of the plurality of wheel brakes,
a first master cylinder configured to adjust a hydraulic pressure of the first hydraulic circuit, and
a first motor;
a second actuator comprising:
a second hydraulic circuit configured to supply a braking force to at least a remainder of the plurality of wheel brakes,
a second master cylinder configured to adjust a hydraulic pressure of the second hydraulic circuit, and
a second motor;
an electronic parking brake (EPB) configured to generate a braking force on the one or more rear wheels;
a regenerative braking system configured to generate a regenerative braking force;
a first electronic control unit (ECU) configured to, upon determining whether or not the first actuator and the second actuator malfunction, control at least one of the first actuator, the second actuator, the electronic parking brake, or the regenerative braking system; and
a first hydraulic active roll stabilizer configured to reduce a roll moment of the vehicle,
wherein the first hydraulic active roll stabilizer is configured to receive hydraulic pressure from the first actuator.

16. The apparatus of claim 15, further comprising:
a second hydraulic active roll stabilizer configured to reduce the roll moment of the vehicle; and
a driving information detector configured to detect driving information of the vehicle,
wherein the second hydraulic active roll stabilizer is configured to receive a hydraulic pressure from the second actuator,
the first ECU is configured to, based on the detected driving information, determine whether a cornering is required for the vehicle, and
the first ECU is configured to, when the cornering is required for the vehicle, reduce the roll moment of the vehicle by using the first hydraulic active roll stabilizer or the second hydraulic active roll stabilizer.

17. The apparatus of claim 15, further comprising:
a redundancy master cylinder configured to generate a braking force based on a pedal stroke of a brake pedal,
wherein the redundancy master cylinder is configured to brake the vehicle upon determining that both the first actuator and the second actuator malfunction.

* * * * *